(No Model.)

G. PHILION.
TRUCK.

No. 511,793. Patented Jan. 2, 1894.

Attest
C. W. Gill
J. F. Tascher

Inventor
Geo. Philion
By his Atty.,
R. D. O. Smith

THE NATIONAL LITHOGRAPHING COMPANY,
WASHINGTON, D. C.

UNITED STATES PATENT OFFICE.

GEORGE PHILION, OF MISHAWAKA, INDIANA.

TRUCK.

SPECIFICATION forming part of Letters Patent No. 511,793, dated January 2, 1894.

Application filed August 6, 1892. Serial No. 442,378. (No model.)

*To all whom it may concern:*

Be it known that I, GEORGE PHILION, of Mishawaka, in the county of St. Joseph and State of Indiana, have invented new and useful Improvements in Trucks for Transportation of Heavy Articles; and I do hereby declare that the following is a full and accurate description of the same, reference being had to the accompanying drawings, in which—

Figure 1:
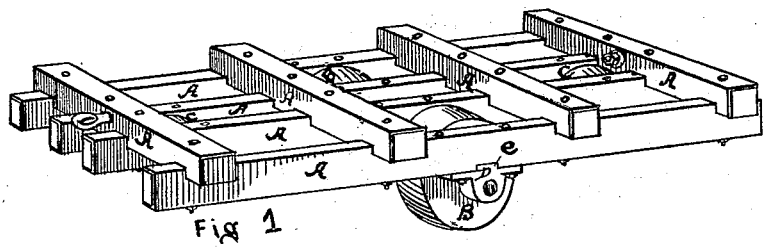
Figure 2:
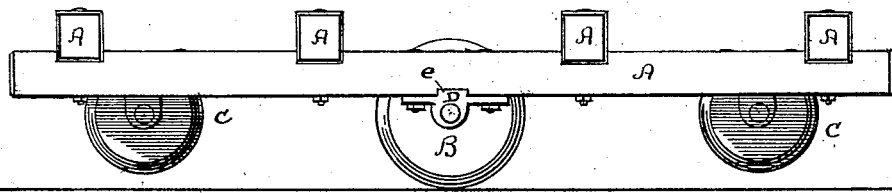
Figure 3:
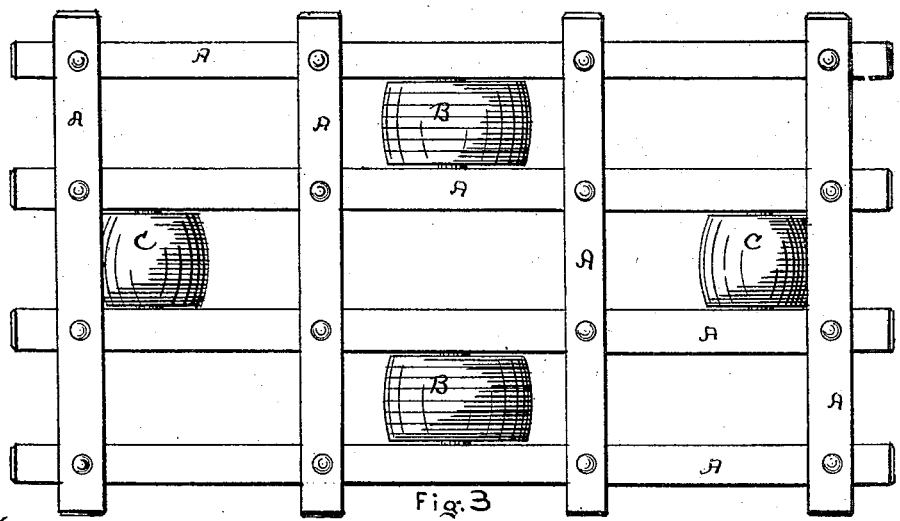

Figure 1 is a perspective view of my truck. Fig. 2 is a side elevation of the same. Fig. 3 is a plan of the same.

This invention is adapted to a great variety of purposes but will be most widely useful as a floor truck for use in ware houses, stores, manufactories, &c., though I have used one on a common dirt road for moving logs to the saw mill, and other heavy weights.

Its advantages are in its lowness which renders it easy to put the load on or off, and in the ease with which it may be handled when loaded.

The platform is composed of a grid of bars A firmly secured at their intersections. Those which I have made are composed of wooden bars halved together at their intersections, and secured by a screw bolt through the joint, but it is apparent they may be otherwise constructed in a variety of known ways and of either metal or wood. For ordinary store, shop or ware house use the grid platform may be about four feet long by two and a half feet wide. These dimensions may be increased or diminished as desired to adapt the truck to certain purposes. The platform is supported upon rollers or low wheels B, the axes of which are independent and will therefore permit the truck to turn as on a pivot, which is a matter of very great practical convenience, as it will permit it to be propelled and guided in a way which would be impossible were the bearing wheels mounted on the same shaft as has been common. The two wheels B. B. are under the platform at its middle of length, so that the load may be balanced upon them, and a similar wheel C is placed at either end to support the truck and load if it shall be slightly out of balance. Where the main central pivot rollers are flat on their bearing faces, their width is such, by reason of their being made of considerable lateral dimension so as to support a heavy weight, without sinking into the ground or flooring, that in turning there is inevitably considerable friction of these flat surfaces upon the ground or floor, and this amount of rubbing or friction increases with the weight handled by the truck so that in some instances it is difficult to turn. According to my improvement however the main central pivot wheels upon which the vehicle is turned in a horizontal plane are rounded from edge to edge so that the free backward rolling of one wheel and forward rolling of the other may take place without any rubbing of such faces upon the floor or ground. The extreme pressure is just at the apex of the curved surface of each wheel and the pressure may therefore be said to be upon a vertical plane or line, approximating what would be the result if each wheel were a mere plane without thickness.

The wheels B. C. of the trucks which I have built are made of hardwood boards, glued up with grain crossing and turned slightly barrel shaped, so as to have great strength and present a small area of contact with the floor. This form of the wheel renders it easy to change the direction of progression. For an ordinary floor truck four feet in length the wheels B will be about six inches in diameter, and the wheels C about five inches in diameter. Each wheel is provided with a short axle rigidly secured to the wheel. When the wheel is made of wood this axle is keyed or otherwise fastened to flange plates which are bolted through to the wheel.

The bearing box plates D are provided with transverse ribs e which enter proper channels or gains in the under side of the bar A and retain the box plate accurately in place and axial line, relieving the bolts of all duty, except that of keeping the parts together.

Having described my invention, I claim—

A balanced truck consisting of a frame or platform, having front and rear rollers C C, and main central wide rollers B of larger diameter than the first mentioned rollers, and axle boxes E for said rollers having ribs e fitted into the body of the said frame or platform, whereby in turning the truck under a heavy load the displacements of said bearings, by horizontal pressure is prevented, substantially as set forth.

GEORGE PHILION.

Witnesses:
R. D. O. SMITH,
C. W. GILL.